United States Patent [19]

Bassin et al.

[11] 4,081,259

[45] Mar. 28, 1978

[54] METHOD FOR FORMING COATED CELLULAR GLASS PELLETS

[75] Inventors: Morton Bassin; Eugene Tseng, both of Northridge, Calif.

[73] Assignee: Maryland Environmental Service, Annapolis, Md.

[21] Appl. No.: 725,700

[22] Filed: Sep. 23, 1976

[51] Int. Cl.² ............................................. C03B 19/08
[52] U.S. Cl. ........................................ 65/21; 65/22; 106/40 V; 264/45.5; 427/193
[58] Field of Search ................... 65/21, 22; 106/40 V; 264/43, 45.5; 427/181, 193, 215

[56] References Cited

U.S. PATENT DOCUMENTS

| | | | |
|---|---|---|---|
| 2,123,536 | 7/1938 | Long | 65/22 |
| 3,056,184 | 10/1962 | Blaha | 65/22 X |
| 3,505,089 | 4/1970 | Rostoker | 65/22 X |
| 3,564,084 | 2/1971 | Pennachetti | 264/43 X |
| 3,870,496 | 3/1975 | Cutler | 65/22 |
| 3,900,303 | 8/1975 | Mackenzie | 65/22 |
| 3,975,174 | 8/1976 | Camerlinck | 106/40 V X |

Primary Examiner—Robert L. Lindsay, Jr.
Attorney, Agent, or Firm—Trask & Britt

[57] ABSTRACT

A method for forming small, smooth surfaced foamed glass pellets with a coated surface of ash is disclosed. The method involves the recovery of waste glass, typically soda/lime/silica glass, crushing and sizing same to obtain particles of less than 200 mesh. The small particles may be pelletized in a pelletizing disk, drum, rotary kiln or other compressive or extrusion devices by the addition of water until the small particles begin to agglomerate. The pellets are then coated with a high-melting point release agent, especially ash, and then heated to a temperature above the softening point of the glass to cellulate the glass agglomerates to form substantially spherical pellets having a bulk density of as low as eight pounds per cubic foot and possessing a very fine, substantially uniform pore structure. The pellets have numerous uses as bulk insulating material and as lightweight aggregate for addition to various matrices, including various resinous thermoplastic and thermosetting materials, and to inorganic bodies such as gypsum, plaster and particularly concrete.

10 Claims, No Drawings

METHOD FOR FORMING COATED CELLULAR GLASS PELLETS

BACKGROUND OF THE INVENTION

1. Field: The instant invention relates to processes for forming cellular glass pellets from individual solid waste glass particles.

2. Prior Art: Various techniques have been practiced for producing small particles of foamed glass, including the crushing of large slabs of foamed glass. Such techniques have produced foam glass particles with a porous surface and a substantial number of open cells. It has been found that when such foam glass particles have been used as a lightweight aggregate for addition to various matrices, that such pellets absorb a substantial quantity of the matrix material and further present a very extended surface which may be attacked by alkali, moisture and other elements which are corrosive to glass.

In U.S. Pat. No. 3,321,414, a process is disclosed which involves granulating glass to form particles of about 0.5 to about two millimeters in diameter. Fine particles are admixed with an alkali metal silicate solution and an organic substance and fed onto a granulating device, such as a pelletizing pan. The granular particles discharged from the granulating device have a diameter within a range of about 0.5 to about two millimeters. These granulates are then fed to a kiln for firing after being coated with a release agent such as bentonite.

In U.S. Pat. No. 3,532,480 of D'Eustachio, a process is set forth for forming sheets of cellulated glass by admixing of small particles, that is, particles less than about 200 mesh, in the presence of a binder, such as sodium silicate and a foaming agent such as carbon black to form small pellets. These pellets are then dried and a parting agent or release agent such as alumina, in the form of a hydrate, thereafter added. The amount of parting agent is limited so that upon foaming the parting agent prevents the pellets from adhering to the walls of the kiln or each other until after the foaming has been initiated but permits the pellets to become sufficiently sticky so that the pellets when discharged from the kiln and subjected to a compaction force distort, agglomerate and form a unitary mass or sheet.

OBJECTS OF THE INVENTION

It is an object of the instant invention to provide a process for forming discrete, individual foam glass pellets of a substantially uniform pore size without the addition of a binding agent.

It is a further object of the instant invention to provide a process for forming small, cellular glass pellets from waste glass without the addition of a blowing or foaming agent.

Another object of the instant invention is to form discrete cellular glass pellets having a smooth skin with or without a refractory coating thereon.

DESCRIPTION OF INVENTION

The instant invention comprises a method for forming small, smooth-surfaced, foamed glass pellets whereby solid glass is crushed to a particle size of less than 200 mesh and added to a pelletizing disk, drum or any pelletizing device with sufficient additional water to bring the moisture content of the mass to about 5 to about 20 percent, preferably from about 6 to 10 percent wherein the small particles of glass are substantially uniformly wetted. The wet glass particles are rolled for a sufficient period of time into small agglomerates. The agglomerated pellets are then coated or dusted with a high melting point inorganic release agent of low moisture content and preferably without any water of hydration, such as ash, to form small agglomerates with a coating of said release agent thereon. The agglomerates are then heated to a temperature above the softening point of the glass to cellulate said glass to form individual, discrete pellets of a foamed glass with a refractory material bonded thereto, such as ash, in a substantially monoparticle layer.

Waste glass is typically the source of glass material for use in the instant process. Waste glass is generally preferred inasmuch as it is generally a soda/lime/silica glass with a relatively low softening point and is generally available in most localities. The waste glass is typically bottle glass that is recovered from a resource recovery system which processes municipal garbage to separate the garbage into the organic and inorganic phases and to separate glass from other waste components.

A typical waste glass composition is as follows:

| Material | Percent by Weight Range |
|---|---|
| $SiO_2$ | 60–75 |
| CaO and/or MgO | 5–10 |
| $Na_2O$ | 10–15 |
| $K_2O$ | 1–3 |
| C | Trace |

The waste glass cullet typically has a softening point of less than 950° Centigrade.

The waste glass used in this invention generally has a small residue of organic or carbonaceous material absorbed or adherent thereto. The ease with which the waste glass particles expand to form cellulated particles indicates that the organic residue may assist in the foaming action. The waste glass may also have some absorbed or unabsorbed water associated with it which may also assist in the foaming action. The waste glass particles readily expand into lightweight cellulated particles at elevated temperatures without addition of any foaming agent or binder, which is contrary to the traditional practice of foaming or expanding pristine glass particles.

Although the major constituents of the waste glass used in this invention are listed above, since the waste glass may come from many sources, other ingredients may be present, usually in minor quantities, such as;

aluminum oxide
titanium oxide
barium oxide
lead oxide
cobalt oxide
copper oxide
iron oxide
boron oxide
zinc oxide
sulfur and sulfates
chromium oxide and similar materials found in various specialty glasses and in metallic and metallic oxide coatings for glass.

The waste glass preferably utilized in the instant invention comes from a municipal waste recovery plant. Municipal waste comprises organic (paper, plastics and waste food products primarily), metallic (ferrous and aluminum metals primarily) and glass waste which includes nonvitreous materials such as stones and ceramic materials. Typically, the waste is wet, i.e., it has some significant moisture content. The presence of some moisture in the recovered glass waste is not greatly affected by the waste recovery process, i.e., whether a wet or dry waste recovery process is utilized.

In a wet waste recovery process municipal waste is ground (shredded) and passed through a magnetic separator to recover ferrous materials. The residue is then air-classified to remove the lighter materials (generally paper, plastics and drier food wastes) to be used as a fuel. The heavy fraction is passed to a mineral jig, i.e., a wet gravity separator, wherein the middle fraction, which is usually composed of glass, ceramics and stones, is recovered. This middle fraction is dewatered, optionally dried, and directed to a glass processing unit, such as described hereinafter.

The first three steps of the dry waste recovery process, i.e., shredding, magnetic separation and air classifying, are similar to the wet process just described. After the air classifier, the material is screened to remove oversize material, then directed to a fluidized bed specific gravity table, which is a type of air classifier for separating heavier materials according to their density. Again, the middle fraction consists mostly of glass, ceramics and stones.

The waste glass is fragmented to a small particle size, for example, chunks having a nominal diameter of about one-quarter inch. These chunks are placed in a ball mill or other device for reducing the glass to a very fine particle size. The material which discharges from the fine crushing stage is then screened on 200 mesh screens and the minus 200 mesh particles retained for further processing. The oversized material is returned for further size reduction.

The very fine particles of crushed glass are then fed onto a pelletizer or to a rotary drum with water being added to bring the moisture content of the mass up to about 5 to about 20 percent, and preferably from about 6 to about 10 percent. The thoroughly wetted particles are then rolled in the kiln or on the pan until agglomerates are formed. These agglomerates normally have a dimension ranging from 0.5 mm to 20 mm. Since the green strength of a pellet or agglomerate is particularly important, it has been found that decreasing the particle size of the glass, that is, maintaining the particles at minus 200 mesh, increases the green strength. Also, increasing the moisture content up to about 10 percent and increasing the compacting time further increases the green strength of the particles.

Ash particles may be mixed with the crushed glass before agglomeration. This forms a composite core of foamed glass and ash with a release agent coating adherent to the exterior. Although other refractory materials such as clays, corundum and the like may be included in the core of the pellet, ash is preferred for this purpose.

A binding agent such as a sodium or potassium silicate may be added in a solution to hasten the agglomerating action. However, it is found that excellent agglomerates are formed without a binding agent and that the presence of the binding agent often results in a foamed glass particle with foam pores of rather uneven and often large dimensions in comparison to the small, uniform pores of cellular glass pellets formed without sodium silicate or other binding agent being present.

In a wet state, the agglomerated particles are fed to a device wherein the particles are coated with a high temperature melting release agent, that is, a release agent which has a melting point substantially above the softening point of the glass. A particularly useful release agent for this purpose is ash. Ash is a waste product and is generally available in very small particle size, that is, particles of less than about 0.5 mm.

The ash utilized in this invention generally has a low moisture content and unlike clays, contains substantially no water of hydration. Although the chemical composition of ash does not differ markedly from that of some clays, the ash forms a far superior coating for the cellular glass particles, especially for incorporation in solid matrices such as concrete, gypsum, plastic and the like. The absence of water of hydration in the ash may be a significant factor in its superior properties as a coating for cellular glass particles used as additives in concrete, gypsum and plastic.

The ash utilized in this invention has a typical chemical composition as follows:

| Material | Percent by Weight Range |
|----------|-------------------------|
| $SiO_2$ | 35–50 |
| $Al_2O_3$ | 20–40 |
| $Fe_2O_3$ | 1–16 |
| $CaO$ | 2–16 |
| $MgO$ | 1–3.5 |
| $K_2O$ | 2.0–5.5 |
| $SO_3$ | 0.5–2.5 |
| $C$ | 0.1–10.0 |

The ash is preferably in the form of small spheres. A typical median particle size for the ash is from about 10.0 to about 80.0 microns. The ash has a bulk density of about 40 to about 100 lbs/ft$^3$.

The ash used in this invention may result from various combustion processes utilizing a fossil fuel containing a minor quantity of silica and other inorganic compounds, generally present as oxides or as compounds containing various anions of chlorine and sulfur, including chlorites, chlorates, sulfates, sulfites and the like. The ash may be fly ash which is recovered from combustion stacks, chimneys, etc. or bottom ash which is removed from the hearth region of a furnace. Fly ash may generally be utilized in the instant invention without further processing. Also, fly ash has been found to provide pellets with outstanding properties. Bottom ash may require sizing and screening to obtain ash particles of the desired size. Also, bottom ash may require treatment to remove or neutralize excessive soluble alkaline or acidic compounds which failed to combust or were a product of the combustion, but did not become a part of the vitreous ash. For use in inorganic matrices, ash of a slightly acidic nature is generally preferred.

Although ash is the preferred release agent in the instant process, other high temperature inorganic materials, particularly alumina, mullite, silicon carbide, tungsten carbide, natural pozzolan and the like may be used. Ash is preferred since it is a particularly effective vitreous release agent.

The ash coats the wet pellets thoroughly and the coated pellets are then directed to a kiln wherein the pellets are heated to a temperature of about 700° to about 950° C. for a period sufficient to cause cellulation of the pellets but without degrading the pellets. The residence time of about 10 minutes to about a half hour is generally sufficient. At temperatures below about 700° C. the pellets do not cellulate well and at temperatures above about 950° C. the glassy material becomes molten and the pellets are destroyed.

It is significant in the instant invention that neither a binding agent nor a foaming agent is required. The glass becomes cellulated because of trapped air, trapped water (absorbed, adsorbed, water of hydration or all three), impurities in the waste glass or a combination of these factors.

The presence of a binding agent, such as sodium silicate, is not required and is generally not preferred inasmuch as the sodium silicate tends to act as a flux for the glass. Since the sodium silicate coats the agglomerated particle it would also be in contact with the release agent. The sodium silicate would tend to melt before the glass particles and any cellulating action would tend to take place first in the sodium silicate. Furthermore, the sodium silicate by melting could seep through the coating of ash and tend to make the particles sticky.

Processing according to the instant invention without the use of a binder or foaming agent tends to produce foam glass particles which have little tendency to adhere to one another. The discharging of the particles from the kiln to a rotary cooling device is sufficient to de-agglomerate any foam glass particles which have agglomerated.

The pellets discharging from the kiln are directed into the cooler, as indicated hereinabove, to cool the particles and to de-agglomerate any which have adhered together. The pellets are cooled so that they may be screened without adverse affects on the screen. The very fine material, mainly ash, is returned for reprocessing.

In the above-mentioned processes a binder such as sodium silicate can be added to assist in the agglomeration of the glass particles or the mixture of glass particles and ash on the pelletizing pan. It has been found that no significant advantage is achieved in using a binder and some disadvantages may result when the initial glass particles have a size of less than minus 200 mesh. However, with larger sized glass particles, that is, particles having a size greater than 200 mesh, the addition of a binder such as a dilute sodium silicate solution is an agglomeration aid. However, with a binder it has been noted that the pore size of the resulting foam glass pellet is not as fine nor as uniform as pellets formed without a binder.

Also, generally it has been found that no foaming agent is required to be added in the process as previously outlined. However, if desired, a small amount of carbon black or other material which volatilizes or decomposes at temperatures less than about 900° C. but preferably at temperatures above about 700° C. can be added.

EXAMPLES

Example 1

A waste glass, primarily of a soda-lime-silica bottle glass composition, was crushed, ground, and sized to have a particle size less than about 200 mesh. It was then mixed with sufficient water to bring the moisture content up to about 8 percent by weight and then agglomerated on an inclined pelletizing pan operated at an angle of about 30 degrees and revolved at about 60 R.P.M. Fine agglomerates having a median size of about three to five millimeters were formed. These agglomerates were then passed into a kiln and mixed with fly ash having a median particle size of about 40 microns. The forward portion of the kiln was unheated. The fly ash coated agglomerates then passed into a fired kiln portion.

In the firing portion of the kiln the pellets had an average residence time of about ten minutes at 840° C. The foam pellets were discharged into a rotating cooler and from there were discharged at a temperature less than about 200° F.

The foam glass pellets had an average diameter of about four to seven millimeters and had a thin coating of ash bonded thereto. A portion of the pellets were returned to the cooler and rotated for a sufficient period of time to substantially abrade away the fly ash coating so that a comparison could be made between foam glass pellets with an ash coating and foam glass pellets with substantially no coating.

The foam glass pellets with the fly ash coating generally appeared to be stronger and more rigid than the pellets without a coating. Also, the moisture absorption and permeability of the fly ash coated pellets were much less than that of the uncoated pellets. Ash coated pellets and uncoated pellets were exposed to a moist atmosphere for a period of time sufficient to cause some disintegration of the uncoated pellets while the fly ash coated pellets showed no disintegration from the humid atmosphere.

The compressive strength of the fly ash coated foamed pellets varies exponentially with the density of the pellets, as illustrated in the following table.

TABLE I

| Specific Gravity | Compressive Strength (psi) |
| --- | --- |
| 0.2 | 100 |
| 0.3 | 300 |
| 0.4 | 700 |
| 0.5 | 1200 |
| 0.6 | 1800 |

The above data were obtained for foamed glass samples having up to about 15% by weight fly ash contained in the glass core.

EXAMPLE 2

Finely ground glass having a particle size less than about 200 mesh was prepared as in Example 1. To this was added about 25 percent by weight of fly ash. The mixture was then added to a pelletizing pan and then mixed with water to bring the moisture content up to about 8 percent by weight. Fine agglomerates having a median particle size of about three to five millimeters were formed.

The agglomerates were then fed to the forward portion of the kiln where they were admixed with fly ash to form a coating thereon and then passed to the fired portion of the kiln where the agglomerates had a residence time of about 20 minutes of about 850° C. The foam pellets being discharged from the kiln were then fed to a cooler. The foamed and cooled glass pellets had an average size of about four to seven millimeters. The pellets had good structural strength and were abrasion resistant.

Pellets made from waste glass and finely ground bottom ash are similarly processed to form a hard, abrasion resistant product.

We claim:

1. A method of forming small, smooth surfaced foamed glass pellets comprising:
   (a) crushing solid waste glass to a particle size of less than −200 mesh;

(b) adding water to said glass particles substantially uniformly wetting said fine glass particles;

(c) forming said wet glass particles into small pellets;

(d) coating said pellets release agent having a substantially higher melting point than said glass particles;

(e) heating said coated glass to a temperature above the softening point of said glass to cellulate said glass;

(f) cooling said coated cellulated glass pellets.

2. The method of claim 1 wherein said waste glass is primarily of a soda-lime-silica composition.

3. The method of claim 1 wherein water is added in sufficient quantity to give a moisture content of about 5 to 20% by weight moisture.

4. The method of claim 1 wherein said release agent has a particle size less than 0.5 mm.

5. The method of claim 1 wherein said coated glass pellets are heated to a temperature of about 700° to about 950° C.

6. The method of claim 1 wherein the release agent is ash.

7. The method of claim 1 wherein fine ash is admixed with the fine glass particles prior to wetting.

8. The method of claim 1 wherein the release agent of claim 1 consists of fine Alumina, Mullite, Corundum, pozzolan, or tungsten carbide.

9. The method of claim 1 wherein said small pellets are formed by rolling the wet glass particles for a sufficient period to form small pellets.

10. The method of claim 1 wherein said pellets are coated with a release agent by rolling of said pellets in the presence of a high melting point release agent.

* * * * *